(12) United States Patent
Kim et al.

(10) Patent No.: US 9,023,498 B2
(45) Date of Patent: May 5, 2015

(54) RECHARGEABLE BATTERY

(75) Inventors: Duk-Jung Kim, Yongin-si (KR); Jae-Ik Kwon, Yongin-si (KR); In Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 352 days.

(21) Appl. No.: 13/403,081

(22) Filed: Feb. 23, 2012

(65) Prior Publication Data

US 2013/0011703 A1    Jan. 10, 2013

Related U.S. Application Data

(60) Provisional application No. 61/505,357, filed on Jul. 7, 2011.

(51) Int. Cl.
*H01M 2/30* (2006.01)
*H01M 2/20* (2006.01)
*H01M 2/06* (2006.01)
*H01M 2/34* (2006.01)

(52) U.S. Cl.
CPC ........ *H01M 2/30* (2013.01); *H01M 2/06* (2013.01); *H01M 2/34* (2013.01); *H01M 2200/103* (2013.01); *H01M 2200/20* (2013.01)

(58) Field of Classification Search
CPC .......... H01M 2/06; H01M 2/34; H01M 2/30; H01M 2200/103; H01M 2200/20
USPC .................. 429/61, 175, 178, 179
See application file for complete search history.

(56) References Cited

U.S. PATENT DOCUMENTS

| | | | |
|---|---|---|---|
| 6,377,432 B1 | 4/2002 | Hashimoto | |
| 8,507,129 B2 * | 8/2013 | Kim | 429/175 |
| 8,592,079 B2 * | 11/2013 | Kim | 429/178 |
| 2009/0320277 A1 * | 12/2009 | Barrella et al. | 29/623.1 |
| 2010/0279156 A1 | 11/2010 | Kim et al. | |
| 2011/0039136 A1 * | 2/2011 | Byun et al. | 429/56 |
| 2011/0244310 A1 * | 10/2011 | Kim | 429/158 |

FOREIGN PATENT DOCUMENTS

| | | |
|---|---|---|
| EP | 1246276 A2 | 10/2002 |
| EP | 2 579 357 A1 | 7/2012 |
| JP | 2010055786 A * | 3/2010 |
| KR | 10-2007-0054845 A | 5/2007 |
| KR | 10-2008-0019321 A | 3/2008 |

OTHER PUBLICATIONS

Machine Translation of JP 2010-055786.*
European Office Action dated Jan. 15, 2014.
European Search Report dated Oct. 30, 2012.
(Continued)

*Primary Examiner* — Jonathan Jelsma
(74) *Attorney, Agent, or Firm* — Lee & Morse, P.C.

(57) ABSTRACT

A rechargeable battery includes a case having an interior and an exterior, an electrode assembly having first and second electrodes, the electrode assembly being disposed in the interior of the case, and an electrode terminal member at the exterior of the case and electrically connected to the first electrode, wherein the electrode terminal member includes a first plate and a second plate, the first plate and the second plate being spaced apart from each other.

17 Claims, 13 Drawing Sheets

(56) References Cited

OTHER PUBLICATIONS

European Office Action dated Aug. 8, 2014.

European Office Action dated Mar. 25, 2015 for EP 12 175 332.1, Kim, et al.

* cited by examiner

RECHARGEABLE BATTERY

CROSS-REFERENCE TO RELATED APPLICATION

The present application claims priority under 35 U.S.C. §119(e) to U.S. Provisional Application No. 61/505,357, filed on Jul. 7, 2011, and entitled: "Rechargeable Battery," which is incorporated herein by reference in its entirety.

BACKGROUND

1. Field

The described technology relates generally to a rechargeable battery including an external short part and a fuse part.

2. Description of the Related Art

A rechargeable battery is a battery that can be repeatedly charged and discharged, unlike a primary battery.

A low-capacity rechargeable battery is used for small portable electronic devices such as a mobile phone, a notebook computer, and a camcorder and a large-capacity rechargeable battery is used as a power supply for driving a motor such as a hybrid car.

The rechargeable battery includes an electrode assembly around which a positive electrode and a negative electrode are wound, having a separator therebetween, a case having the electrode assembly embedded therein, a cap plate sealing an opening of a case, and an electrode terminal electrically connected to the electrode assembly by penetrating through the cap plate.

The above information disclosed in this Background section is only for enhancement of understanding of the background of the described technology and therefore it may contain information that does not form the prior art that is already known in this country to a person of ordinary skill in the art.

SUMMARY

According to an embodiment, there is provided a rechargeable battery including a case having an interior and an exterior, an electrode assembly having first and second electrodes, the electrode assembly being disposed in the interior of the case, and an electrode terminal member at the exterior of the case and electrically connected to the first electrode, wherein the electrode terminal member includes a first plate and a second plate, the first plate and the second plate being spaced apart from each other.

The rechargeable battery may further include a fuse connecting the first plate and the second plate.

An entirety of the fuse may be disposed at the exterior of the case.

The fuse may be integrated with the electrode terminal member.

The rechargeable battery may further include a short circuit part that includes a short circuit tab connected to the second plate and a short circuit plate electrically connected to the second electrode, the short circuit plate being spaced apart from the short circuit tab in a normal condition and being deformable into contact with the short circuit tab to electrically connect the first electrode and the second electrode.

The first plate, the fuse, the second plate and the short circuit tab may be integrally composed of a unitary piece of sheet metal.

The fuse may be in a form of a bent part connecting ends of the first plate and the second plate, the fuse having a narrower width than that of the first plate and the second plate.

The fuse may be meltable in response to a current generated by triggering of a short circuit condition.

The case may further include a cap plate that seals an opening of the case, the electrode terminal member and the short circuit tab being disposed at an exterior of the cap plate.

The rechargeable battery may further include an insulator that insulates the first plate and the short circuit tab from the cap plate and fills a space between the first plate and the second plate, the insulator being an insert-molded material in which the first plate and the short circuit tab are embedded.

The rechargeable battery may further include a rivet terminal extending from the interior to the exterior of the case through the cap plate. The first plate may include a first plate through hole that engages the rivet terminal at the exterior of the case. The second plate and the insulator may respectively include a second plate through hole and a first insulator hole to expose the rivet terminal.

The cap plate may be electrically connected to a second terminal. The short circuit plate may be embedded in the cap plate adjacent the exterior thereof.

The short circuit tab may include a short circuit tab hole corresponding to a center of the short circuit plate.

The insulator may further include a second insulator hole corresponding to the short circuit plate. A sealing member may extend from the short circuit tab into the second insulator hole. A bottom cover may be coupled to the insulator and may support the sealing member, the sealing member, the bottom cover sealing an area between the insulator and the cap plate.

The first plate, the second plate, the fuse, the short circuit tab and the insulator may constitute an outer module.

The first plate, the second plate, the fuse, the short circuit tab, and the insulator of the outer module may constitute an integral assembly, the outer module being disposed at the exterior of the cap plate.

The rivet terminal, an insulating member, and a first lead tab may constitute an inner module.

The rivet terminal, the insulating member, and the first lead tab of the inner module may constitute an integral assembly, the inner module being disposed at an interior side of the cap plate.

DETAILED DESCRIPTION

Figure 1:
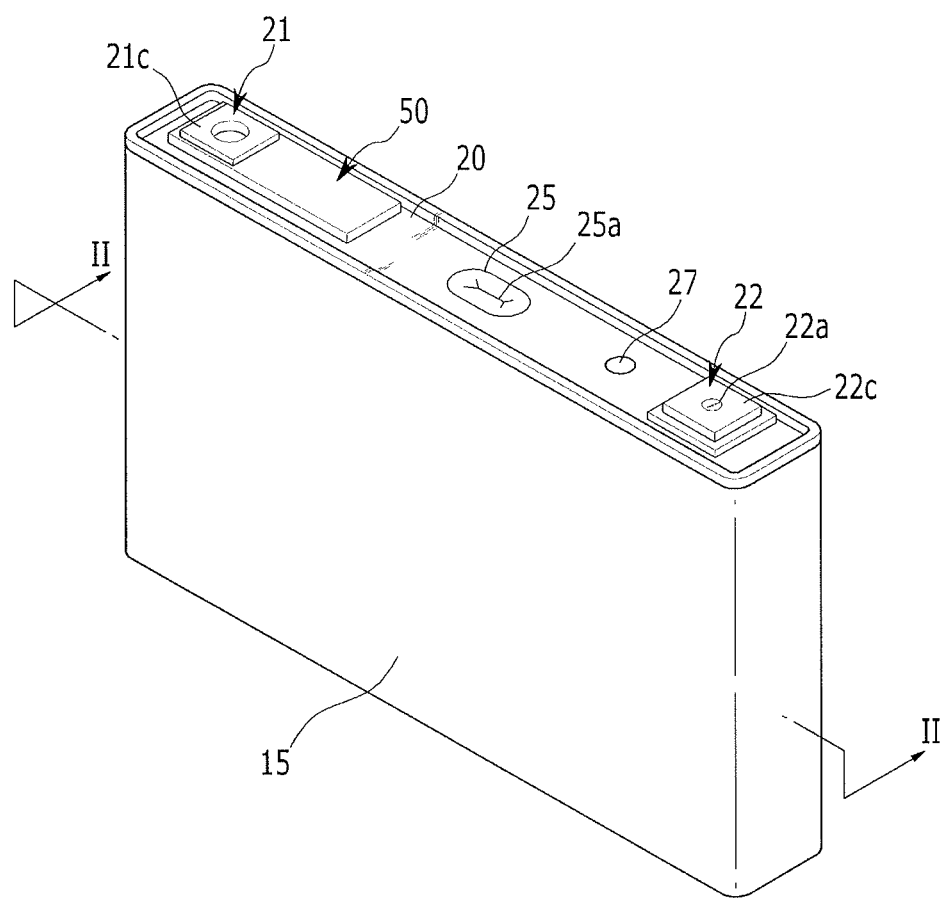
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. In addition, it will also be understood that when a component is referred to as being "between" two other components, it can be the only component between the two other components, or one or more intervening components may also be present. Like reference numerals refer to like elements throughout.

Figure 2:
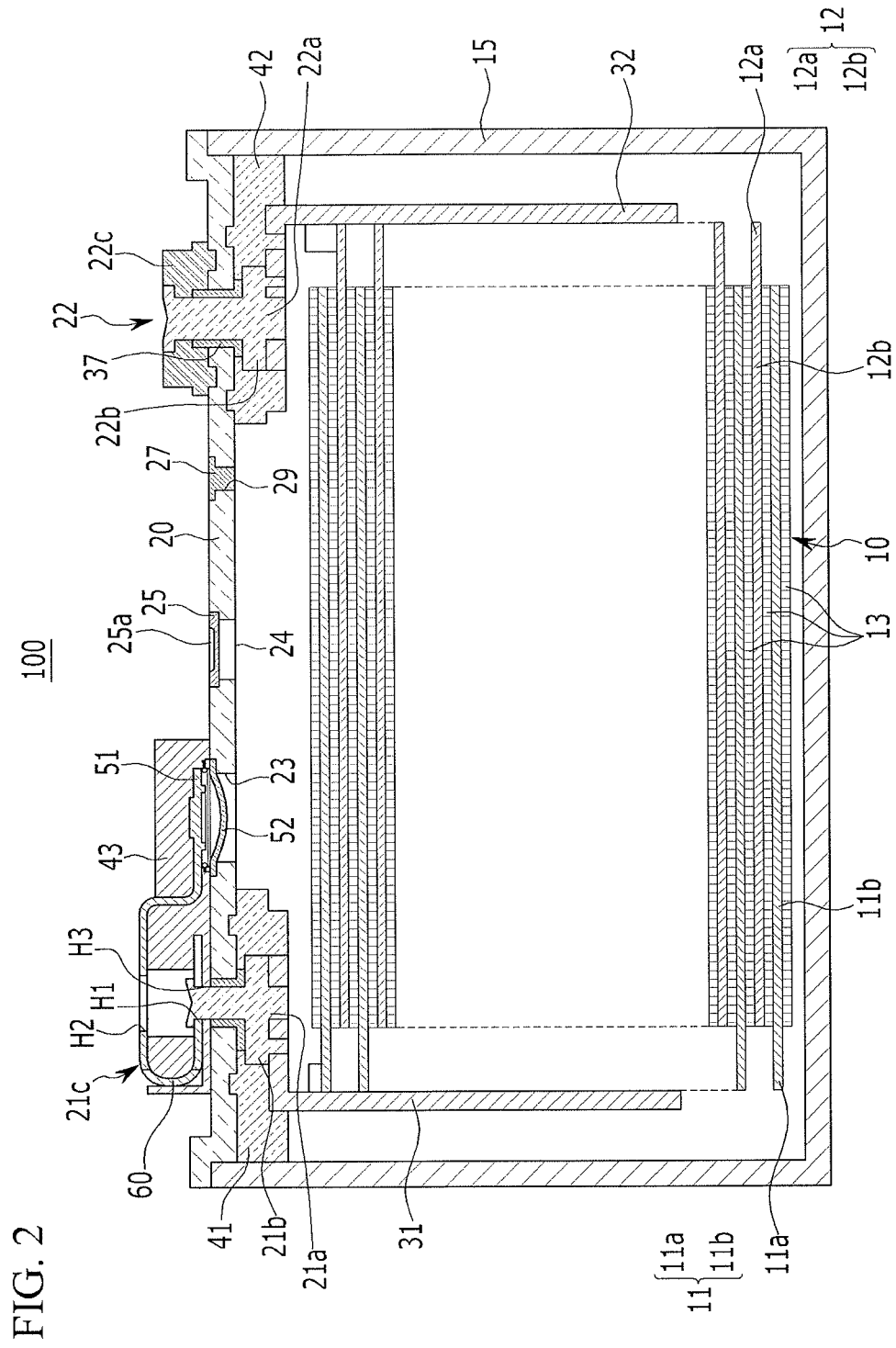
FIG. 2 illustrates a cross-sectional view taken along line II-II in FIG. 1.

FIG. 1 is a perspective view of a rechargeable battery according to an exemplary embodiment and FIG. 2 is a cross-sectional view taken along line II-II in FIG. 1.

Referring to FIGS. 1 and 2, a rechargeable battery according to this exemplary embodiment may include an electrode assembly 10 that charges and discharges current, a case 15 accommodating the electrode assembly 10, a cap plate 20 that is coupled with an opening of the case 15, a first terminal (hereinafter, referred to as a "negative terminal 21"), and a second terminal (hereinafter, referred to as a "positive terminal 22") that are disposed on the cap plate 20, an external short circuit part 50 and a fuse part 60 that are disposed at a negative terminal 21 side.

For example, the electrode assembly 10 may be formed by disposing the first electrode (hereinafter, referred to as a "negative electrode 11") and a second electrode (hereinafter, referred to as a "positive electrode 12") on both sides of an insulator, that is, a separator 13 and winding the negative electrode 11, the separator 13, and the positive electrode 12 in a jelly roll shape.

In addition, the electrode assembly may also be assembled by stacking the positive electrode and the negative electrode configured of a single plate, having a separator therebetween. The electrode assembly also may be assembled by stacking the negative electrode, the separator, and the positive electrode in a zigzag way (not shown).

The negative electrode 11 and the positive electrode 12 may each include coated parts 11b and 12b, formed by applying an active material to a current collector of a metal plate, and uncoated parts 11a and 12a, which are exposed portions of the current collector to which the active material is not applied.

The uncoated part 11a of the negative electrode 11 may be disposed at one end of the negative electrode 11 when the negative electrode 11 is in a wound state. The uncoated part 12a of the positive electrode 12 is disposed at one end of the positive electrode 12 when the positive electrode 12 is in a wound state. The uncoated parts 11a and 12a may each be disposed at opposite ends of the electrode assembly 10.

For example, the case 15 may be formed in an approximately rectangular parallelepiped so as to form a space receiving the electrode assembly 10 and an electrolyte inside. The case 15 may have an opening connecting the outer space with the inner space formed on one surface of the rectangular parallelepiped. The opening may allow the electrode assembly 10 to be inserted into the case 15.

The cap plate 20 may be formed of a thin steel sheet to be inserted into the opening of the case 15, thereby sealing the case 15. The cap plate 20 may further include an electrolyte inlet 29 and a vent hole 24. The electrolyte may be injected through the electrolyte inlet 29 into the case 15 after the cap plate 20 is coupled with the case 15. After the electrolyte is injected, the electrolyte inlet 29 may be sealed with a sealing closure 27.

The vent hole 24 may be sealed with the vent plate 25. When the internal pressure of the rechargeable battery reaches a predetermined value, the vent plate 25 may be incised to open the vent hole 24 so as to discharge the internal pressure of the rechargeable battery. The vent plate 25 may have a notch 25a inducing the incision.

The negative terminal 21 and the positive terminal 22 may be installed to penetrate through the cap plate 20 and may be electrically connected to the electrode assembly 10. The negative terminal 21 may be electrically connected to the negative electrode 11 of the electrode assembly 10, and the positive terminal 22 may be electrically connected to the positive electrode 12 of the electrode assembly 10. Therefore, the electrode assembly 10 may be drawn out to the outside of the case 15 through the negative terminal 21 and the positive terminal 22

The negative terminal 21 and the positive terminal 22 may have the same structure on the inside of the cap plate 20. Accordingly, similar structures will be described together and different structures, such as structures at the outside of the cap plate 20, will be separately described.

The negative and positive terminals 21 and 22 may include rivet terminals 21a and 22a installed in the terminal hole of the cap plate 20, flanges 21b and 22b integrally widely formed in the rivet terminals 21a and 22a in the cap plate 20, and electrode terminal members 21c and 22c disposed at the outside of the cap plate 20 and connected to the rivet terminals 21 and 22a by riveting or welding. The electrode terminal members 21c and 22c may be formed to have different structures, and therefore, each of them will be described separately below.

Negative and positive gaskets 36 and 37 may be disposed between the rivet terminals 21a and 22a of the positive and negative terminals 21 and 22 and the inner surface of the terminal hole of the cap plate 20 to seal between the rivet terminals 21a and 22a of the positive and negative terminals 21 and 22 and the cap plate 20. The negative and positive gaskets 36 and 37 may be more extendedly mounted between the flanges 21b and 22b and the inner surface of the cap plate 20 to better seal between the flanges 21b and 22b and the cap plate 20. The negative and positive gaskets 36 and 37 may install the positive and negative terminals 21 and 22 on the cap plate 20 to prevent the electrolyte from being leaked through the terminal hole.

Negative and positive lead tabs 31 and 32 may electrically connect the negative and positive electrodes 11 and 12 of the electrode assembly to the negative and positive terminals 21 and 22. The negative and positive lead tabs 31 and 32 may be connected to the bottom ends of the rivet terminals 21a and 22a while being supported by the flanges 21b and 22b, by coupling the negative and positive lead tabs 31 and 32 to the bottom ends of the rivet terminals 21a and 22a to caulk the bottom ends thereof.

The negative and positive insulating members 41 and 42 may be installed between the negative and positive lead tabs 31 and 32 and the cap plate 20 to electrically insulate the negative and positive lead tabs 31 and 32 from the cap plate 20. In addition, one side of each of the negative and positive insulating members 41 and 42 may be coupled to the cap plate 20 and the other side thereof may surround the negative and positive lead tabs 31 and 32, the rivet terminals 21a and 22a, and the flanges 21b and 22b, thereby stabilizing the connection structure thereof.

The external short circuit part 50 may be provided at the negative terminal 21 and the fuse part 60 may be provided at the electrode terminal member 21c of the negative terminal 21. Herein, the electrode terminal member 21c of the negative terminal 21 will be described first and then the fuse part 60 and the external short circuit part 50 will be described in connection with the electrode terminal member 21c.

Figure 3A:
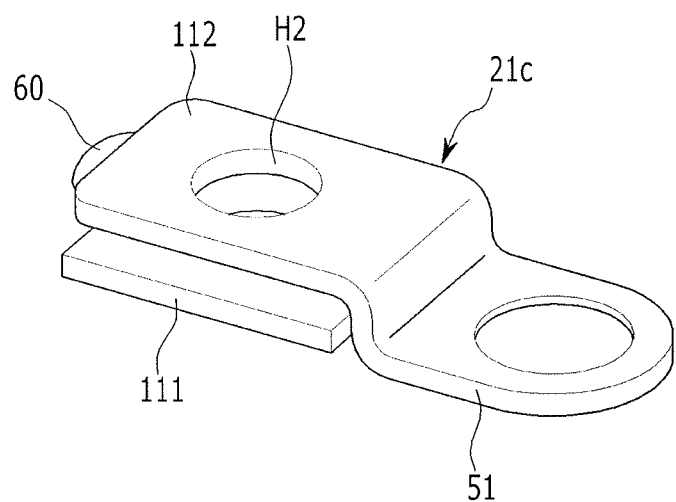
FIGS. 3A and 3B illustrate perspective views of an electrode terminal member and a short circuit tab of the rechargeable battery according to the embodiment of FIGS. 1 and 2.
Figure 3B:
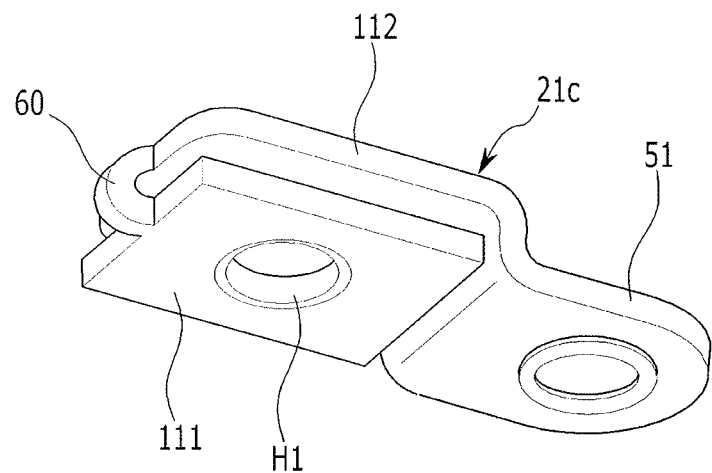

FIGS. 3A and 3B are perspective views of the electrode terminal member 21c and the short circuit tab 51 of the rechargeable battery according to the embodiment of FIGS. 1 and 2. Referring to FIGS. 2, 3A, and 3B, the electrode terminal member 21c may include a first plate 111 electrically connected to the negative electrode 11 of the electrode assembly 10 and a second plate 112 that is spaced from and in parallel with the first plate 111.

Meanwhile, the external short circuit part 50 may include a short circuit tab 51 bent at the second plate 112, having a height and a short circuit plate 52 provided at the short circuit hole 23 of the cap plate 20 electrically connected to the positive electrode 12 of the electrode assembly 10.

At the positive terminal 22, the electrode terminal member 22c may be mounted on the outer surface of the cap plate 20, and the rivet terminal 22a may be connected to the electrode terminal member 22c by welding or riveting, such that the cap plate 20 and the short circuit plate 52 have a positive polarity.

At the electrode terminal member 21c of the negative terminal 21, the first plate 111 may have a first plate through hole H1 and may be connected by welding or riveting to the rivet terminal 21a inserted into the first plate through hole H1. The second plate 112 may be connected to the first plate 111 via the fuse part 60.

The second plate 112 may have a second plate through hole H2 corresponding to the first plate through hole H1 and with a diameter larger than that of the first plate through hole H1.

The second plate through hole H2 may be formed to have a large diameter, allowing a welding torch or a riveting mechanism to be inserted into a contact portion between the first plate through hole H1 and the rivet terminal 21a.

The fuse part 60 may be formed to have a narrower width than the widths of the first and the second plates 111 and 112 such that the fuse part 60 is broken first during a discharging of high current. The electrode terminal member 21c including the first and second plates 111 and 112 and the fuse part 60 may be formed by cutting a sheet metal and curving the sheet metal at the fuse part 60. The machineability of the fuse part 60 may be improved and the costs and weight may be reduced.

The short circuit tab 51 that has negative polarity may be spaced from and may face the short circuit plate 52 that has positive polarity. The short circuit tab 51 may be formed of a sheet metal integrated with the electrode terminal member 21c. The short circuit plate 52 may be welded to the short circuit hole 23 to be convexly formed toward the inner portion of the case 15.

Therefore, when the rechargeable battery operates normally, the short circuit plate 52 maintains a distance from the short circuit tab 51. When the internal pressure of the rechargeable battery is abnormally increased, the short circuit plate 52 may be inverted by the internal pressure to contact the short circuit tab 51. The negative electrode 11 and the positive electrode of the electrode assembly 10 may be shorted at the outside of the rechargeable battery.

Figure 4A:
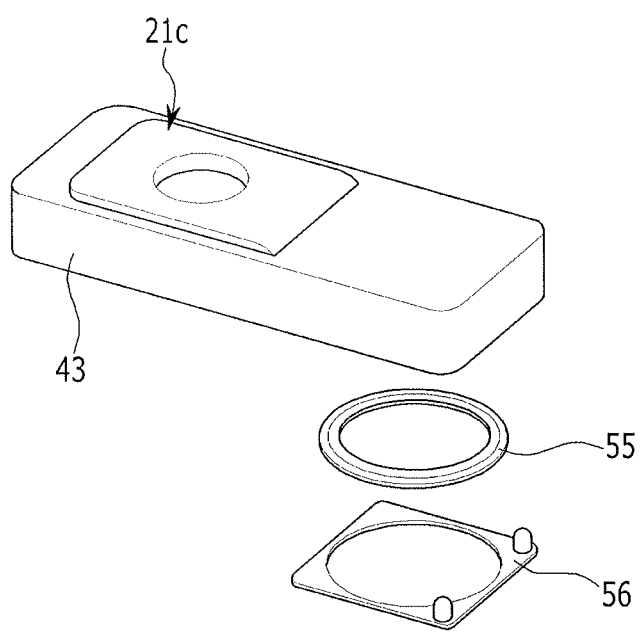
FIGS. 4A and 4B illustrate perspective views in a state of insert-molding the electrode terminal member and the short circuit tab of the rechargeable battery according the embodiment of FIGS. 1 and 2.
Figure 4B:
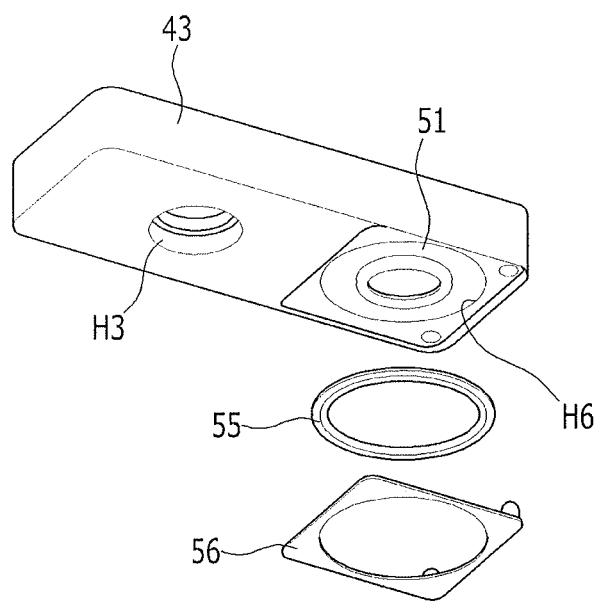

FIGS. 4A and 4B are perspective views showing the electrode terminal member 21c and the short circuit tab 51 that are insert-molded, of the rechargeable battery according to the embodiment of FIGS. 1 and 2. Referring to FIGS. 2, 4A, and 4B, the electrode terminal member 21c and the short circuit tab 51 may be partially embedded in the insulator 43 by insert molding.

For example, the first plate 111 and the short circuit tab 51 of the electrode terminal member 21c may be embedded in the insulator 43. A first insulator hole H3 may be formed in the insulator and may be connected to the first plate through hole H1 of the first plate 111. The rivet terminal 21a may be inserted into the first insulator hole H3 and the first plate through hole H1 through the terminal hole of the cap plate 20. The top end of the rivet terminal 21a may protrude to the top surface of the first plate 111 to be connected to the first plate through hole H1 of the first plate 111 by riveting.

The second plate 112 may be exposed to the outside of the insulator 43 to be connected to a bus bar (not shown). The fuse part 60 may be exposed to the outside while being received at one side of the insulator 43. The fuse part 60 may be broken at the outside of the case at the time of discharging of high current, and may not affect the inside of the case 15 even when an arc is generated after the fuse part 60 is broken. In addition, the design degrees of freedom of the fuse part 60 may be increased and the problem of reduction in the mechanical strength thereof may be solved.

Figure 5:
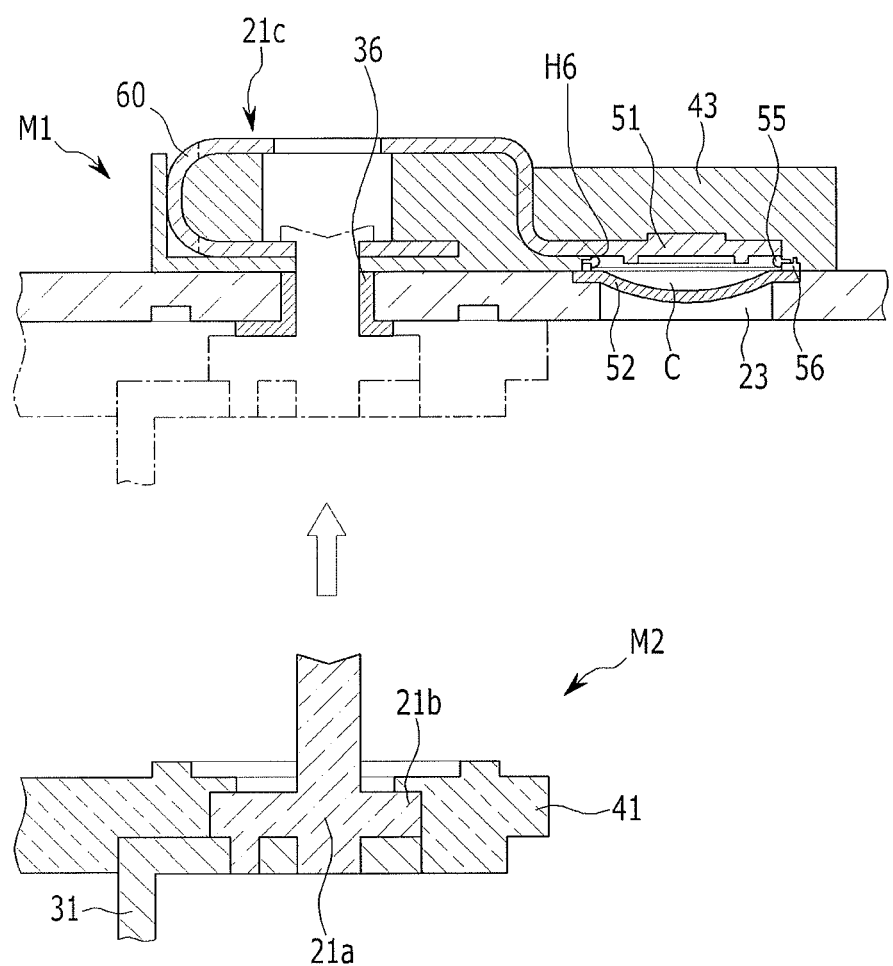
FIG. 5 illustrates a cross-sectional view showing a state of connecting a rivet terminal that is coupled to an electrode assembly to the electrode terminal member through a terminal hole of a cap plate of the rechargeable battery according to the embodiment of FIGS. 1 and 2.

FIG. 5 is a cross-sectional view showing a state in which the rivet terminal 21a connected to the electrode assembly 10 is connected to the electrode terminal member 21c through the terminal hole of the cap plate 20 of the rechargeable battery according to the embodiment of FIGS. 1 and 2.

An empty space C may be provided between the short circuit tab 51 and the short circuit plate 52. The short circuit tab 51 may be embedded in the insulator 43, such that the space C is not affected by the change in external pressure, thereby maintaining a predetermined pressure. That is, even when the external pressure is lowered due to a move of the rechargeable battery and a change in the environment in which the rechargeable battery is used, the short circuit plate 52 may be prevented from being inverted by the external pressure and then contacting the short circuit tab 51, which may lead to a short circuit.

In addition, a second insulator hole H6 corresponding to the short circuit plate 52 may be formed in the insulator 43. The second insulator hole H6 may be filled by the short circuit tab 51. A sealing member 55 may be provided at an edge of the short circuit tab 51 along the second insulator hole H6. The bottom cover 56 supports the sealing member 55 to be coupled with the insulator 43. The sealing member 55 and the bottom cover 56 may seal the area between the insulator 43 and the cap plate 20.

Referring to FIG. 5, the electrode terminal member 21c provided at the outside of the cap plate 20, the fuse part 60, and the short circuit tab 51, the insulator 43 embedding them may form a single module, that is, an external module M1.

The rivet terminal 21a, the negative insulating member 41, and the negative lead tab 31 at the negative terminal 21 provided in the cap plate 20 may form another module, that is, an inner module M2.

Further, the inner module M2 may be similarly formed at the positive terminal 22 side and may include the electrode assembly 10 connected to the negative and positive lead tabs 31 and 32.

Therefore, the inner module M2, the cap plate 20, and the outer module M1 may be integrally assembled by preparing the inner module M2 (drawn in solid lines) and the outer module M1, inserting the rivet terminal 21a of the inner module M2 (drawn in dotted lines) into the terminal hole of the cap plate 20, having the negative gasket 36 therebetween, and riveting the rivet terminal 21a to the first plate through hole H1 of the first plate 111 of the outer module M1. Therefore, it may become easier to assemble the cap plate 20.

Figure 6:
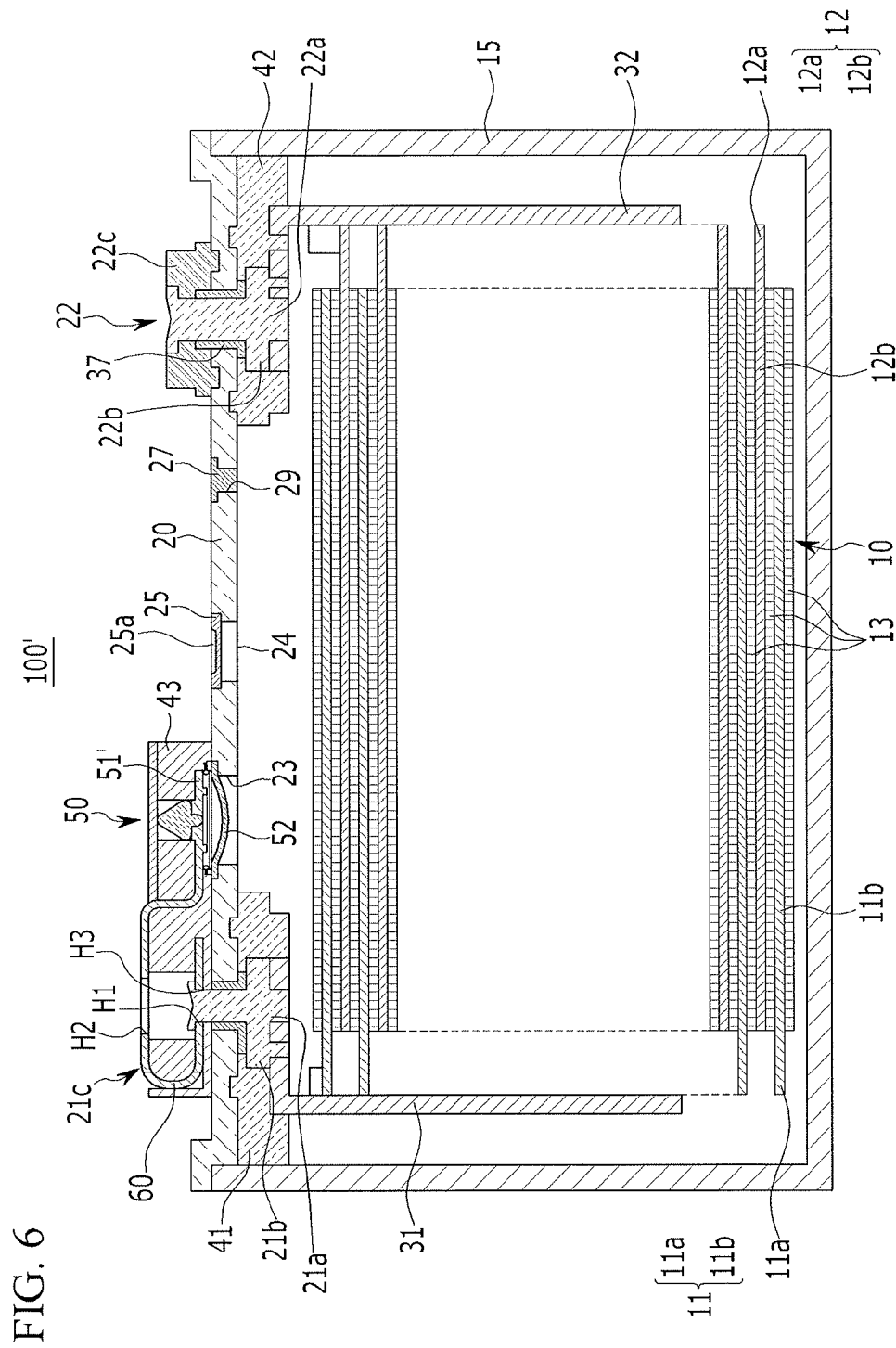
FIG. 6 illustrates a cross-sectional view of a rechargeable battery according to another exemplary embodiment.

FIG. 6 is a cross-sectional view of a rechargeable battery according to another exemplary embodiment.

The rechargeable battery 100' according to exemplary embodiment of FIG. 6 may include an electrode assembly 10 that charges and discharges current, a case 15 accommodating the electrode assembly 10, a cap plate 20 that is coupled with an opening of the case 15, a first terminal (hereinafter, referred to as a "negative terminal") 21 and a second terminal (hereinafter, referred to as a "positive terminal") 22 that are disposed on the cap plate 20, an external short circuit part 50' and a fuse part 60 that are disposed at a negative terminal 21 side. The elements of the rechargeable battery according to this embodiment are identical or similar to the embodiment described above, except for the external short circuit part 50', thus the description of the identical or similar elements will not be repeated. Hereinafter, the external short circuit part 50' and the fuse part 60 will be described.

Figure 7A:
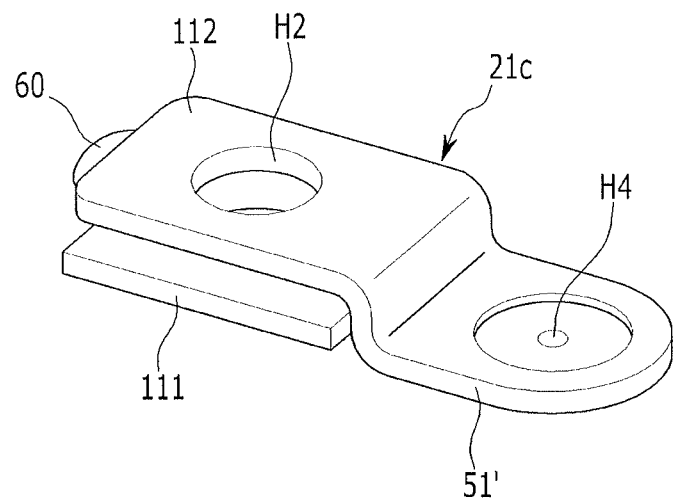
FIGS. 7A and 7B illustrate perspective views of a electrode terminal member and a short circuit tab of the rechargeable battery according to the embodiment of FIG. 6.
Figure 7B:
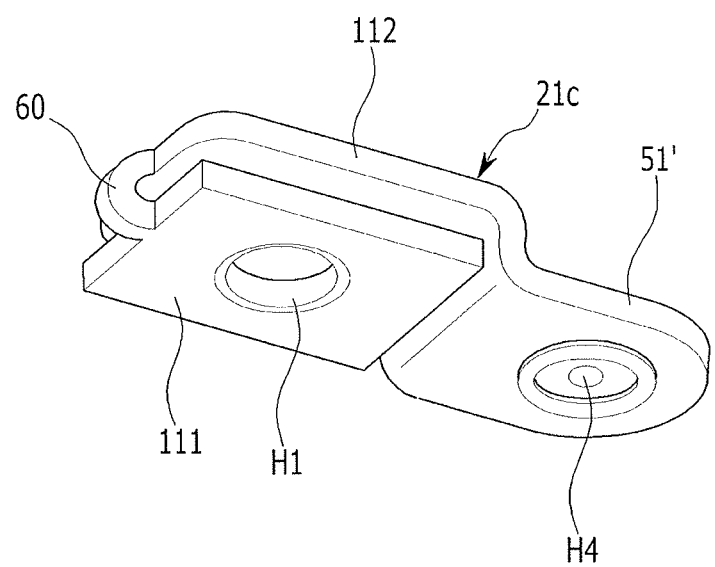

FIGS. 7A and 7B are perspective views of the electrode terminal member 21c and the short circuit tab 51' of the rechargeable battery according to the embodiment of FIG. 6. Referring to FIGS. 6, 7A, and 7B, the electrode terminal member 21c may include a first plate 111 electrically connected to the negative electrode 11 of the electrode assembly 10 and a second plate 112 that is spaced from and in parallel with the first plate 111.

The external short circuit part 50' may include a short circuit tab 51' bent at the second plate 112, having a height and a short circuit plate 52 provided at the short circuit hole 23 of the cap plate 20 electrically connected to the positive electrode 12 of the electrode assembly 10.

At the positive terminal 22, the electrode terminal member 22c may be mounted on the outer surface of the cap plate 20, and the rivet terminal 22a may be connected to the electrode terminal member 22c by welding or riveting, such that the cap plate 20 and the short circuit plate 52 have positive polarity.

At the electrode terminal member 21c of the negative terminal 21, the first plate 111 may have a first plate through hole H1 and may be connected by welding or riveting to the rivet terminal 21a inserted into the first plate through hole H1. The second plate 112 may be connected to the first plate 111 via the fuse part 60.

The second plate 112 may have a second plate through hole H2 corresponding to the first plate through hole H1 and with a diameter larger than that of the first plate through hole H1.

The second plate through hole H2 may be formed to have a large diameter, allowing a welding torch or a riveting mechanism to be inserted into a contact portion between the first plate through hole H1 and the rivet terminal 21a.

The fuse part 60 may be formed to have a narrower width than the widths of the first and the second plates 111 and 112 such that the fuse part 60 is broken first during a discharging of high current. The electrode terminal member 21c including the first and second plates 111 and 112 and the fuse part 60 may be formed by cutting a sheet metal and curving the sheet metal at the fuse part 60. The machineability of the fuse part 60 may be improved and the costs and weight may be reduced.

The short circuit tab 51' that has negative polarity may be spaced from and may face the short circuit plate 52 that has positive polarity. The short circuit tab 51' is formed of a sheet metal integrated with the electrode terminal member 21c. The short circuit plate 52 may be welded to the short hole 23 to be convexly formed toward the inner portion of the case 15.

Therefore, when the rechargeable battery operates normally, the short circuit plate 52 maintains a distance from the short circuit tab 51'. When the internal pressure of the rechargeable battery is abnormally increased, the short circuit plate 52 may be inverted by the internal pressure to contact the short circuit tab 51'. That is, the negative electrode 11 and the positive electrode of the electrode assembly 10 may be shorted at the outside of the rechargeable battery.

Figure 8A:
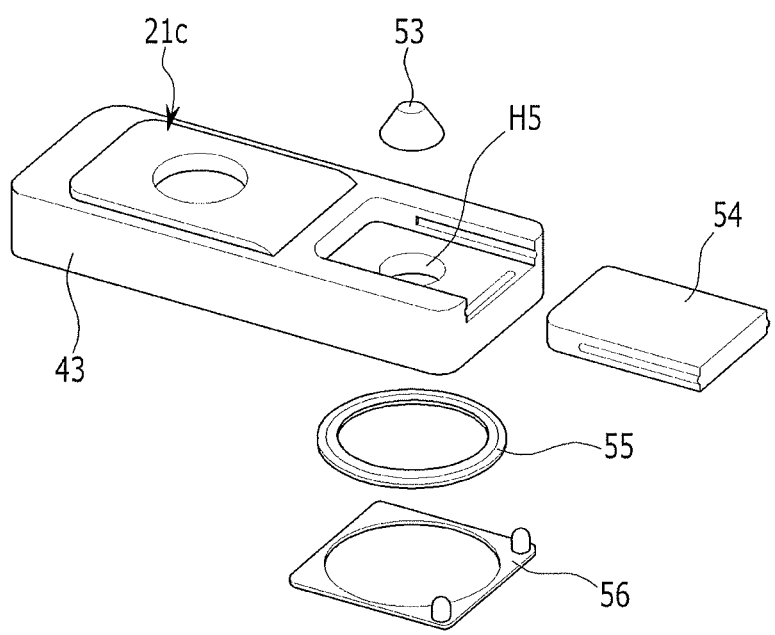
FIGS. 8A and 8B illustrate perspective views in a state of insert-molding the electrode terminal member and the short circuit tab of the rechargeable battery according to the embodiment of FIG. 6.
Figure 8B:
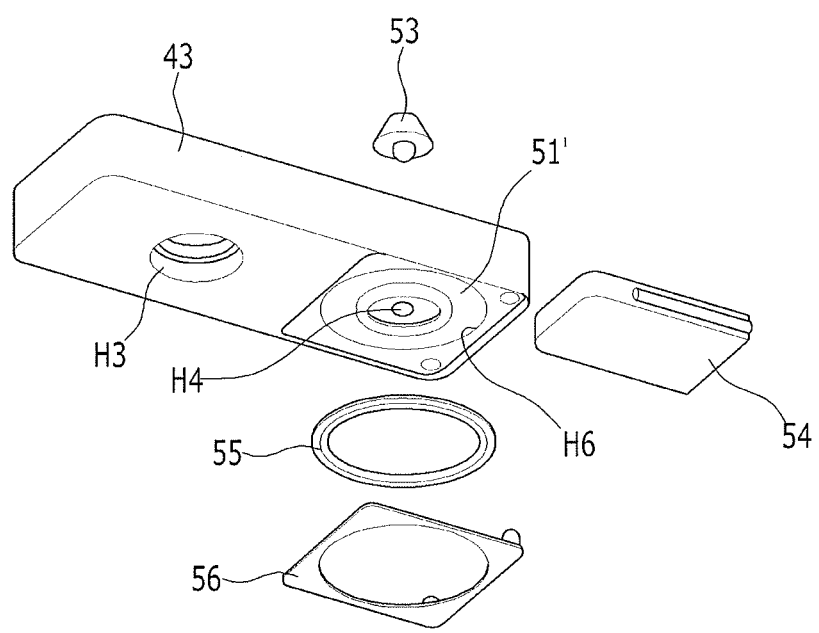

FIGS. 8A and 8B are perspective views showing the electrode terminal member 21c and the short circuit tab 51' that are insert-molded, of the rechargeable battery according to the embodiment of FIG. 6. Referring to FIGS. 6, 8A, and 8B, the electrode terminal member 21c and the short circuit tab 51' may be partially embedded in the insulator 43 by insert molding.

For example, the first plate 111 and the short circuit tab 51' of the electrode terminal member 21c may be embedded in the insulator 43. A first insulator hole H3 may be formed in the insulator and may be connected to the first plate through hole H1 of the first plate 111. Therefore, the rivet terminal 21a may be inserted into the first insulator hole H3 and the first plate through hole H1 through the terminal hole of the cap plate 20. The top end of the rivet terminal 21a may protrude to the top surface of the first plate 111 to be connected to the first plate through hole H1 of the first plate 111 by riveting.

The second plate 112 may be exposed to the outside of the insulator 43 to be connected to a bus bar (not shown). The fuse part 60 may be exposed to the outside while being received at one side of the insulator 43. The fuse part 60 may be broken at the outside of the case at the time of discharging of high current, and may not affect the inside of the case 15 even when an arc is generated after the fuse part 60 is broken. In addition, the design degrees of freedom of the fuse part 60 may be increased and the problem of reduction in the mechanical strength thereof may be solved.

Figure 9:
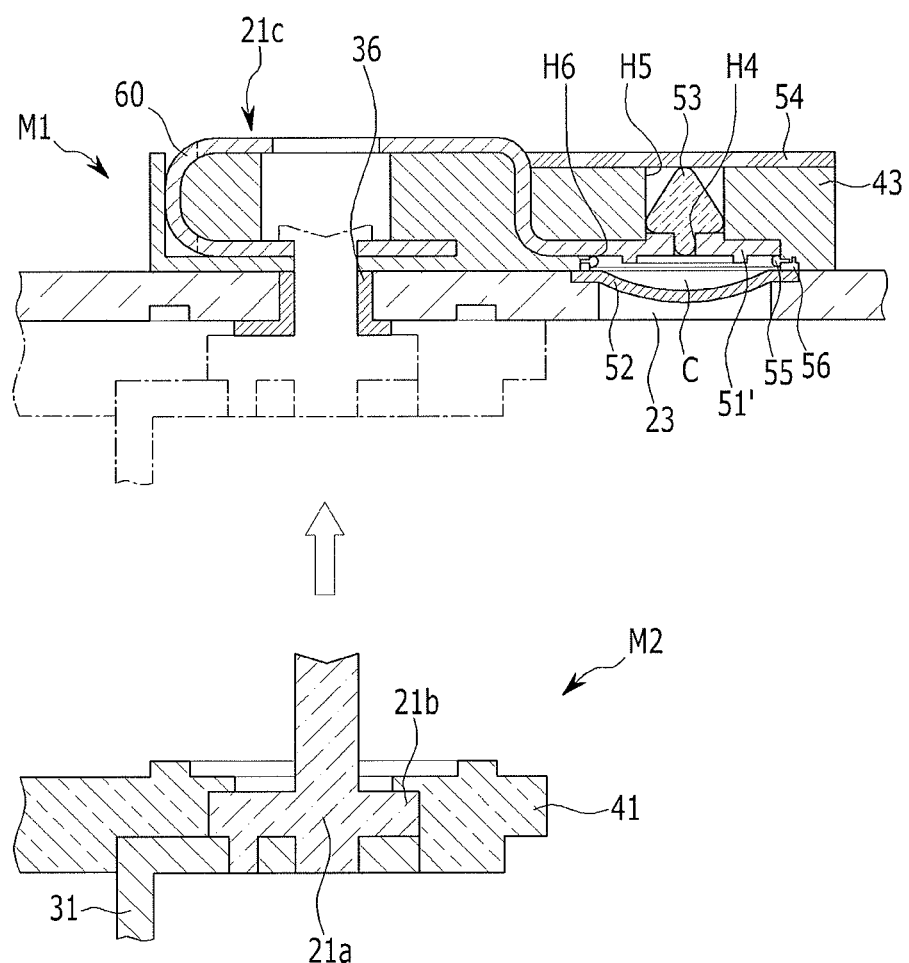
FIG. 9 illustrates a cross-sectional view showing a state of connecting a rivet terminal that is coupled to an electrode assembly to the electrode terminal member through a terminal hole of a cap plate of the rechargeable battery according to the embodiment of FIG. 6.

FIG. 9 is a cross-sectional view showing a state in which the rivet terminal 21a connected to the electrode assembly 10 is connected to the electrode terminal member 21c through the terminal hole of the cap plate 20 of the rechargeable battery according to the embodiment of FIG. 6. Referring to FIGS. 7A to 9, the short circuit tab 51' of the external short part 50' has a short circuit tab hole H4 corresponding to the center of the short circuit plate 52, and the insulator 43 has a third insulator hole H5 corresponding to the short circuit tab hole H4.

An empty space C may be provided between the short circuit tab 51' and the short circuit plate 52. The short circuit tab hole H4 and the third insulator hole H5 are sealed by a sealing closure 53, such that the space C is not affected by the change in external pressure, thereby maintaining a predetermined pressure. That is, even when the external pressure is lowered due to a move of the rechargeable battery and a change in the environment in which the rechargeable battery is used, the short circuit plate 52 may be prevented from being inverted by the external pressure and then contacting the short circuit tab 51', which may lead to a short circuit.

The sealing closure 53 may form the sealing structure of the short circuit tab hole H4 and the third insulator hole H5 while maintaining the compression state by a lid 54 slidably coupled at the top side of the insulator 43. The sealing closure 53 may be made of an elastic material, for example, synthetic resin or rubber.

In addition, the second insulator hole H6 corresponding to the short circuit plate 52 may be formed in the insulator 43. The second insulator hole H6 may be filled by the short circuit tab 51'. The sealing member 55 may be provided at an edge of the short circuit tab 51' along the second insulator hole H6. The bottom cover 56 may support the sealing member 55 to be coupled with the insulator 43. The sealing member 55 and the bottom cover 56 may seal the area between the insulator 43 and the cap plate 20.

Referring to FIG. 9, the electrode terminal member 21c provided at the outside of the cap plate 20, the fuse part 60, and the short circuit tab 51', the insulator 43 embedding them may form a single module, that is, an external module M1.

The rivet terminal 21a, the negative insulating member 41, and the negative lead tab 31 at the negative terminal 21 provided in the cap plate 20 may form another module, that is, an inner module M2.

Further, the inner module M2 may be similarly formed at the positive terminal 22 side and may include the electrode assembly 10 connected to the negative and positive lead tabs 31 and 32.

The inner module M2, the cap plate 20, and the outer module M1 may be integrally assembled by preparing the inner module M2 (drawn in solid lines) and the outer module M1, inserting the rivet terminal 21a of the inner module M2 (drawn in dotted lines) into the terminal hole of the cap plate 20, having the negative gasket 36 therebetween, and riveting the rivet terminal 21a to the first plate through hole H1 of the first plate 111 of the outer module M1. Therefore, it may become easier to assemble the cap plate 20.

By way of summation and review, in a rechargeable battery, excessive heat may be generated or an electrolyte solution may decompose inside the battery case due to repetitive charging and discharging. The heat generation or the electrolyte decomposition may increase the internal pressure of the rechargeable battery. The increase in internal pressure may ignite or explode the rechargeable battery.

In order to prevent the ignition or explosion of the rechargeable battery due to the increase in internal pressure, an external short circuit part may be provided at the outside of the case. The external short circuit part shorts the negative electrode and the positive electrode of the electrode assembly at the outside of the rechargeable battery when the internal pressure of the rechargeable battery is increased. When the external short circuit part is operated to create a short circuit, the charging state of the electrode assembly is reduced due to the discharging of a large amount of current. One or more fuse elements in the form of weak portions at a discharging line connecting the electrode assembly with the electrode terminal may be melted and disconnected due to the discharging of the large amount of current.

In this regard, and as indicated, in order to effectively disconnect the discharging line at the time of the external short or the overcharging, the rechargeable battery may have a fuse part disposed therein. However, after the fuse part is broken due to the melting, an arc may be generated at the broken portion when the broken gap is narrow.

The arc generated in the rechargeable battery may affect the electrolyte solution to cause the ignition or the explosion of the rechargeable battery, which may degrade the stability of the rechargeable battery.

The described technology advances the art by providing a rechargeable battery having a fuse part disposed at the outside thereof so as to maintain stability thereof even when an arc is generated after the fuse part is broken. Moreover, the disposing of the fuse part at the exterior of the battery may enhance the freedom of design of the fuse part.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery comprising:
a case having an interior and an exterior;
an electrode assembly having first and second electrodes, the electrode assembly being disposed in the interior of the case; and
an electrode terminal member at the exterior of the case and electrically connected to the first electrode, wherein the electrode terminal member includes a first plate that contacts a first terminal of the battery and a second plate, the first plate and the second plate being spaced apart from each other with the first plate being closer to the case than the second plate, the first plate having a first through hole and the second plate having a second through hole corresponding to the first through hole and having a larger diameter than the first through hole and further including a fuse connecting the first plate and the second plate.

2. The rechargeable battery as claimed in claim 1, wherein an entirety of the fuse is disposed at the exterior of the case.

3. The rechargeable battery as claimed in claim 1, wherein the fuse is integrated with the electrode terminal member.

4. The rechargeable battery as claimed in claim 2, further including a short circuit part that includes:
a short circuit tab connected to the second plate, and
a short circuit plate electrically connected to the second electrode,
the short circuit plate being spaced apart from the short circuit tab in a normal condition and being deformable into contact with the short circuit tab to electrically connect the first electrode and the second electrode.

5. The rechargeable battery as claimed in claim 4, wherein the first plate, the fuse, the second plate and the short circuit tab are integrally composed of a unitary piece of sheet metal.

6. The rechargeable battery as claimed in claim 5, wherein the fuse is in a form of a bent part connecting ends of the first plate and the second plate, the fuse having a narrower width than that of the first plate and the second plate.

7. The rechargeable battery as claimed in claim 5, wherein the fuse is meltable in response to a current generated by triggering of a short circuit condition.

8. The rechargeable battery as claimed in claim 4, wherein the case further includes a cap plate that seals an opening of the case, the electrode terminal member and the short circuit tab being disposed at an exterior of the cap plate.

9. The rechargeable battery as claimed in claim 8, further including an insulator that insulates the first plate and the short circuit tab from the cap plate and fills a space between the first plate and the second plate, the insulator being an insert-molded material in which the first plate and the short circuit tab are embedded.

10. The rechargeable battery as claimed in claim 9, further including a rivet terminal extending from the interior to the exterior of the case through the cap plate, wherein:
the first plate includes a first plate through hole that engages the rivet terminal at the exterior of the case,
the second plate and the insulator respectively include a second plate through hole and a first insulator hole to expose the rivet terminal.

11. The rechargeable battery as claimed in claim 9, wherein:
the cap plate is electrically connected to a second terminal, and
the short circuit plate is embedded in the cap plate adjacent the exterior thereof.

12. The rechargeable battery as claimed in claim 11, wherein the short circuit tab includes a short circuit tab hole corresponding to a center of the short circuit plate.

13. The rechargeable battery as claimed in claim 12, wherein:
the insulator further includes a second insulator hole corresponding to the short circuit plate,
a sealing member extends from the short circuit tab into the second insulator hole, and
a bottom cover is coupled to the insulator and supports the sealing member, the sealing member, the bottom cover sealing an area between the insulator and the cap plate.

14. The rechargeable battery as claimed in claim 9, wherein:
the first plate, the second plate, the fuse, the short circuit tab and the insulator constitute an outer module.

15. The rechargeable battery as claimed in claim 14, wherein the first plate, the second plate, the fuse, the short circuit tab, and the insulator of the outer module constitute an integral assembly, the outer module being disposed at the exterior of the cap plate.

16. The rechargeable battery as claimed in claim 10, wherein the rivet terminal, an insulating member, and a first lead tab constitute an inner module.

17. The rechargeable battery as claimed in claim 16, wherein the rivet terminal, the insulating member, and the first lead tab of the inner module constitute an integral assembly, the inner module being disposed at an interior side of the cap plate.

* * * * *